Patented July 14, 1931

1,814,888

UNITED STATES PATENT OFFICE

ALEXANDER HUTCHEON BENNETT, OF LONDON, ENGLAND

PROCESS FOR THE RECOVERY OF ESSENTIAL OILS FROM LEMONS AND OTHER FRUITS OF TREES OF THE GENUS CITRUS

No Drawing. Application filed August 9, 1930, Serial No. 474,312, and in Italy June 2, 1930.

This invention relates to the recovery of essential oils from the fruits of trees of the genus citrus, such as lemons, citrons, oranges, limes and shaddocks.

As is known, the essential oils are found in the outer surface of the rind or peel of such fruits and a process is already in existence for recovering these oils which comprises subjecting the surface of the rind or peel to a rasping or grating action during the passage of the fruit through a continuous spray of water.

The rasping or grating action ruptures the walls of the oil cells in the rind or peel and the essence thus liberated forms an emulsion with and is carried away by the water sprayed on the fruits. Upon being allowed to stand for some time in suitable vessels the oil suspended in the water rises to the surface thereof as a thick emulsion or cream which may be separated from the bulk of the water by skimming or the like, the separation of the emulsion into its constituents, oil and water, being effected by filtration through wool or other suitable material and decantation of the clear oil which rises to the surface of the filter.

Now it will be seen that in this process the essential oil is brought into intimate contact with large volumes of water and at the same time exposed to the action of the air. In consequence the oil suffers considerable deterioration, valuable constituents being lost by solution in the water and oxidation, resinification and other chemical changes taking place therein so that the final product is dark in colour, deficient in water-soluble constituents, contains an undue proportion of resinous matter and is generally inferior to the product obtained from the same fruits by hand pressure.

Furthermore, the emulsion of oil and water referred to above is difficult to break so that the acceleration of the separation process by the employment of centrifugal separators is precluded as the latter are found to give but an imperfect separation of the oil and water.

Now the present invention has for its object so to improve the operation of the process to which reference has been made above as to reduce both the time required for effecting separation of the oil and the amount of liquid in circulation in the system while at the same time producing a final product of greatly improved quality.

Broadly stated, therefore, the invention consists in rendering the water employed in the process slightly alkaline.

This is found to inhibit to a marked degree the oxidation, resinification and other reactions above-mentioned while diminishing the losses due to solution and rendering the emulsion of oil and water readily separable by centrifuging. The final product obtained by the improved process is clear and contains a smaller proportion of resinous and colouring matter than usual while the aqueous solution separated therefrom can be returned directly into the circulation to be used again.

As will be understood, the volume of water which it is necessary to keep in the circulation system is reduced owing to the rapid return of the separated aqueous solution into the system.

The amount of alkali to be added to the water may vary for each variety of fruit treated but it has been found that in the case of ordinary lemons the best results are obtained when the amount of alkali added produces a solution having a hydrogen ion concentration equivalent to that of a solution of sodium bicarbonate.

It is preferred to employ sodium bicarbonate as the addition for producing alkalinity in the water employed in the process, the amount added varying from 1% upwards and the best results having been obtained with about 5–6%, but, if desired, the same result may be obtained by adding the appropriate amounts of sodium carbonate and an acid.

A further feature of the improved process resides in the fact that the separation of the aqueous solution from the oil may be further facilitated if the specific gravity of the solution is increased by the addition thereto of soluble neutral salts, such as, for example, sodium sulphate.

For the best results the density of the solution produced by the addition of sodium bicarbonate or the like and a neutral salt to the water should not be less than 10° Tw. and such solutions can be obtained by additions of 5% of sodium bicarbonate and 5% of sodium sulphate or by the addition of various mixtures of such salts. The amount of neutral salt which may be added is of course only limited by the saturation point of the solution but small quantities are employed for reasons of economy.

In order that the invention may be readily understood the process according thereto will now be briefly described.

The fruits to be treated for example, lemons, are passed through a suitable known machine which subjects the outer surfaces of their rinds or peels to a scraping or grating action while a spray or sprays of a 5% solution of sodium bicarbonate is or are directed over said fruits.

The alkaline solution containing the essential oil in suspension is collected and centrifuged in a centrifugal separator, the separated aqueous solution being returned to the spraying nozzles for re-use in the process and the essential oil being further treated in any suitable manner.

As already mentioned the solution employed may contain a soluble neutral salt in addition to the sodium bicarbonate in order to facilitate the separation thereof from the oil.

I claim:—

1. A process for the recovery of essential oils from the fruits of trees of the genus citrus consisting in subjecting the fruits to a rasping or grating action to liberate the oils therefrom, spraying an alkaline solution over said fruits to carry away the liberated oils, collecting the alkaline solution containing the oils and separating the oils from said solution.

2. A process for the recovery of essential oils from the fruits of trees of the genus citrus consisting in subjecting the fruits to a rasping or grating action to liberate the oils therefrom, spraying an alkaline solution over said fruits to carry away the liberated oils, collecting the alkaline solution containing the oils and centrifuging the collected solution to separate the oils therefrom.

3. A process for the recovery of essential oils from the fruits of trees of the genus citrus consisting in subjecting the fruits to a rasping or grating action to liberate the oils therefrom, spraying the said fruits with a solution containing an alkali and a soluble neutral salt in order to carry away the liberated oils, collecting the solution containing the oils and centrifuging the collected solution to separate the oils therefrom.

4. A process for the recovery of essential oils from the fruits of trees of the genus citrus consisting in subjecting the fruits to a rasping or grating action to liberate the oils therefrom, spraying the fruits during said treatment with a solution of sodium bicarbonate in order to carry away the liberated oils, collecting the solution containing the oils and separating the oils from said solution.

5. A process for the recovery of essential oils from the fruits of trees of the genus citrus consisting in subjecting the fruits to a rasping or grating action to liberate the oils therefrom, spraying the fruits during said treatment with a solution of sodium bicarbonate in order to carry away the liberated oils, collecting the solution containing the oils and centrifuging said solution to separate the oils therefrom.

6. A process for the recovery of essential oils from the fruits of trees of the genus citrus consisting in subjecting the fruits to a rasping or grating action to liberate the oils therefrom, spraying the fruits during said treatment with a solution containing sodium bicarbonate and a neutral salt in order to carry away the liberated oils, collecting the solution containing the oils and centrifuging said solution to separate the oils therefrom.

7. A process for the recovery of essential oils from the fruits of trees of the genus citrus as claimed in claim 1, including the step of returning the solution, after the separation of the oils therefrom, into the circulation to be sprayed over the fruits again.

In testimony whereof he has affixed his signature.

ALEXANDER HUTCHEON BENNETT.